(12) United States Patent
Jung

(10) Patent No.: US 7,254,278 B2
(45) Date of Patent: Aug. 7, 2007

(54) DIGITAL IMAGE PROCESSING METHOD

(75) Inventor: Joel Jung, Guyancourt (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 699 days.

(21) Appl. No.: 10/341,910

(22) Filed: Jan. 14, 2003

(65) Prior Publication Data

US 2003/0147559 A1 Aug. 7, 2003

(30) Foreign Application Priority Data

Jan. 16, 2002 (FR) .................................. 02 00487
Mar. 29, 2002 (FR) .................................. 02 04014

(51) Int. Cl.
*G06K 9/40* (2006.01)
(52) U.S. Cl. .................................................. 382/261
(58) Field of Classification Search ................ 382/224, 382/233, 261, 268
See application file for complete search history.

(56) References Cited

U.S. PATENT DOCUMENTS 4,849,810 A * 7/1989 Ericsson ................ 375/240.12
5,920,356 A * 7/1999 Gupta et al. ................. 348/606
7,003,174 B2 * 2/2006 Kryukov et al. ............ 382/266

OTHER PUBLICATIONS

Jung: PPL: A Low Complexity MPEG-4 Post-Processing Algorithm, Sep. 2001, pp. 1-8.
ISO/IEC 14496-2:1999/Amd.1:2000(E), pp. 454-456.

* cited by examiner

*Primary Examiner*—Phuoc Tran (57) ABSTRACT

The present invention relates to a method of post-processing a digital image (Im) comprising pixels, said digital image being encoded and decoded according to a technique of coding by blocks of pixels. Said method comprises a classification step (6) intended to allocate a class ($Cl_i$) to a block ($B_j$) of pixels of said digital image, a step of evaluating the degradation (5) of said digital image delivering a degradation measurement (DM) of said digital image, a filter selection step (9) intended to associate a filter ($F_1$) with a pair of adjacent blocks ($B_j$, $B_k$) according to their respective classes ($Cl_m$, $Cl_n$) and the degradation measurement (DM) of said digital image, a filtering decision step (8) intended to deliver a filtering decision (Dec) for a pair of adjacent blocks ($B_j$, $B_k$) according to the degradation measurement (DM) and a filtering step (11) intended to filter a pair of adjacent blocks ($B_j$, $B_k$) by means of its associated filter ($F_1$) delivering a filtered digital image (ImF). The advantage of such a method is that it is both of low complexity and very effective.

11 Claims, 6 Drawing Sheets

DIGITAL IMAGE PROCESSING METHOD

The present invention relates to a method for the processing of a digital image comprising pixels, said digital image being encoded and decoded according to a pixel-block coding technique, said method comprising a classification step delivering classes, a step of evaluating the degradation of said digital image delivering a measure of degradation of said digital image and a filtering step delivering a filtered digital image.

It also relates to a digital image post-processing device implementing such a method.

It also relates to a computer program using such a method.

It also relates to a signal transporting such a computer program.

It finds its application in particular in video decoders functioning at a low bit rate and in real time, integrated in portable apparatus such as mobile telephones.

In the face of the increasing need to transmit and store digital data, the techniques of compressing or in other words coding data have become widespread. The most usual techniques of compressing video data (video data are also referred to hereinafter as sequences of digital images), such as those of the MPEG ("Motion Picture Expert Group") standards, use block transformation, for example Discrete Cosine Transform (DCT). Such a block transformation has the advantage of offering high compression rates. On the other hand, the quantization step which follows it creates block effects on the decoded digital images which result in degradation of their quality. Quantization is in fact all the more approximate, the lower the encoding rate. Consequently the degradation due to the quantization step may range from an imperceptible level when the encoding rate is high to a very annoying level when it is low.

To remedy this problem, many techniques of post-processing said decoded digital images have been developed over the past few years, in order to correct said block effects. These techniques relate mainly to sequences of digital images encoded and decoded according to the MPEG-2 technique for high-rate applications, for example broadcasting television programs by satellite.

With the development of the Internet and portable equipment, for example mobile telephones or personal assistants, there has appeared the need to transmit video data on mobile networks for low-rate applications in real time. More adapted compression techniques have been implemented in consequence, such as for example the MPEG-4 or H.26L standards, also based on block transformation. In parallel block effect correction techniques more specifically dedicated to low rates have been developed.

The technique of processing a decoded digital image implemented in the MPEG-4 standard is described in the document of the International Standards Organization ISO/IEC JTC 1/SC 29/WG 11, entitled "Information Technology—Coding of Audiovisual Objects—Part 2: Visual", N 3056, pages 454-56, published on Jan. 31, 2000 It aims to correct any block effects present in digital images coded and decoded by means of the MPEG-4 standard.

Figure 1:
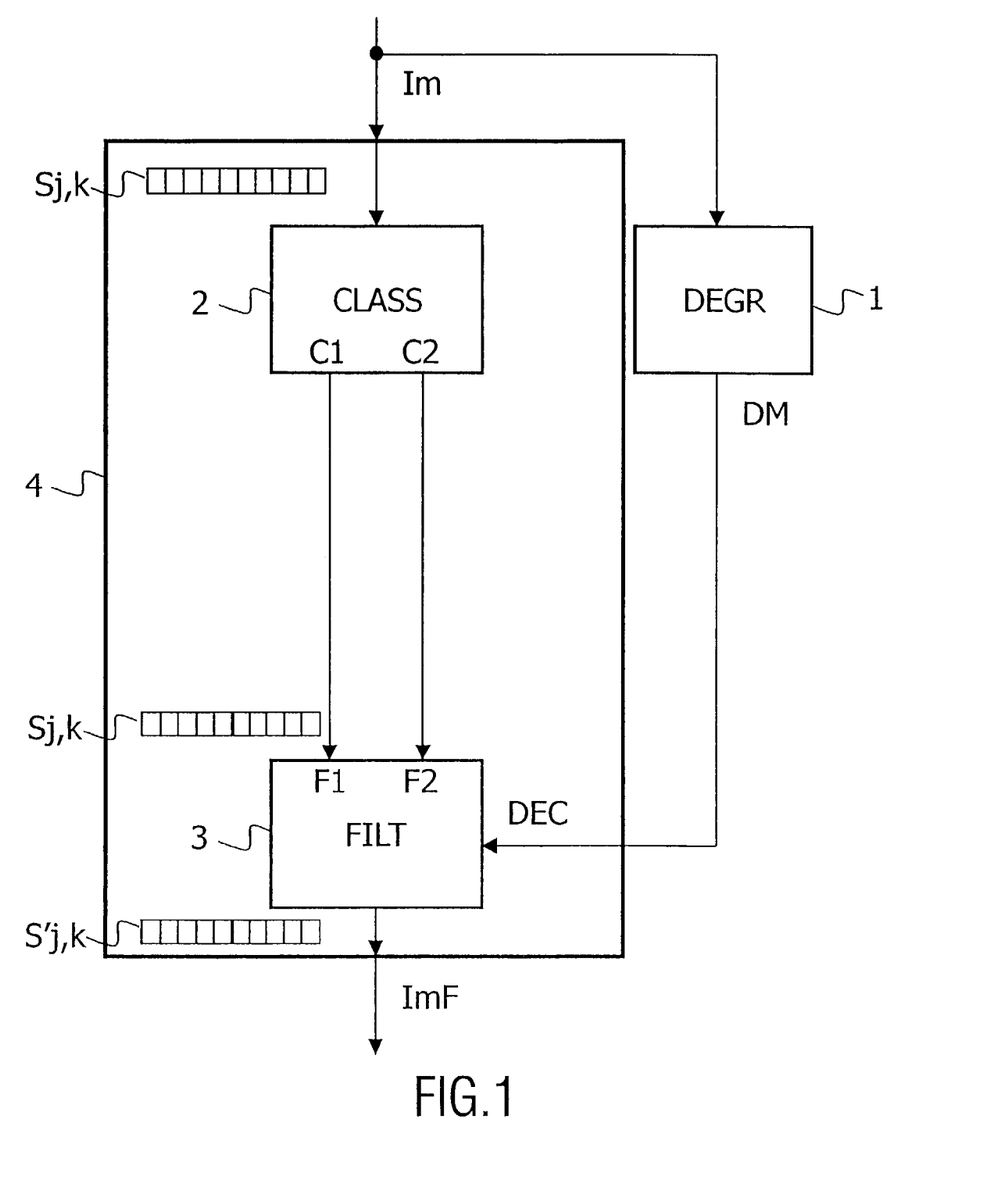
FIG. 1 is a block diagram of the digital image post-processing method according to the state of the art.

Said technique of processing a decoded digital image Im is described in FIG. 1. It comprises the following three steps:

a step of degradation assessment DEGR (1) of the digital image Im, which receives said digital image Im as an input and delivers a measurement of the degradation DM of the image, a classification step CLASS (2), which takes as an input a segment $S_{j,k}$ of a row or column of pixels of two adjacent blocks ($B_j$, $B_k$) of said digital image Im, with $0 \leq j$, $k < nb_{max}$ ($nb_{max}$ being the number of blocks present in the image Im) and $j \neq k$, and allocates to it a class $C_i$ from among a set of two possible classes. The two possible classes are the uniform class $C_1$ and the textured class $C_2$, a filtering step FILT (3), which receives as an input said segment of a row or column of pixels $S_{j,k}$ of two adjacent blocks and, according to the degradation measurement DM, delivers or not a filtered segment $S'_{j,k}$ using the filter $F_1$ if said segment $S_{j,k}$ is of class $Cl_1$ and using the filter $F_2$ if said segment $S_{j,k}$ is of class $C_2$.

It should be noted that the classification steps CLASS (2) and FILT (3) apply to segments of rows or columns of pixels of two adjacent blocks and that consequently said steps are implemented within a loop (4) for scanning the segments of rows or columns of the digital image Im. Once the scanning has been performed, a filtered digital image ImF is obtained.

A major drawback of this method lies in its complexity which, although of the same order as other competing techniques, remains prohibitive for real-time low-rate applications dedicated for example to mobile terminals.

The object of the present invention is to propose a method of processing an image comprising pixels which is less complex for comparable efficacy.

This object is achieved by the method as described in the introductory paragraph and characterized in that it comprises:

said classification step intended to allocate a class to a block of pixels of the digital image, a filter selection step intended to associate a filter with a pair of adjacent blocks according to their respective classes and the degradation measurement of the digital image, a filtering decision step intended to deliver a filtering decision for a pair of adjacent blocks according to the degradation measurement, said filtering step intended to filter a pair of adjacent blocks by means of its associated filter.

Such a method firstly enables a reduction of the complexity. To do this, said classification step is applied to entire blocks instead of to segments of rows or columns of pixels of two adjacent blocks, thus enabling a reduction of the number of classification operations to be performed on the entire decoded digital image.

The filter selection step is no longer applied to segments of rows or columns of pixels of two adjacent blocks, but to pairs of adjacent blocks, which also reduces the number of filter selection operations to be performed.

In the same way the filtering decision step is no longer applied to segments of rows or columns of pixels of two adjacent blocks, but to pairs of adjacent blocks, and hence after a reduction in complexity.

As for the filtering proper, the choice is made from among at least two filters, that is, according to predefined models associating a filter with a pair of classes.

According to a particularly advantageous embodiment of the invention, the classification step is characterized in that it comprises at least four classes, that is to say a homogeneous class, a class of rows, a class of columns and a textured class.

Said classification step therefore comprises at least two additional classes compared with the prior art, that is to say the class of rows and the class of columns. Rows and columns are in fact patterns of blocks which appear frequently on the digital images coded and decoded at a low bit rate. With these two additional classes, said classification step is more selective, which, as will be seen later, considerably simplifies the filtering step compared with that of the prior art, whilst remaining overall just as effective.

According to the above embodiment, the digital image post-processing method is also characterized in that it comprises at least four different filters.

Using at least four very simple linear filters compensates for the fact that said filters are not adaptive, as is the case in the prior art. The visual quality of the filtered digital image is thus comparable with that obtained by the prior art, but at lower computing cost.

According to the previous embodiment, said filtering decision step for a pair of blocks is characterized in that it is intended to inhibit or activate said filter selection step per pair of adjacent blocks. In other words, the decision to filter or not a pair of adjacent blocks is taken not at the filtering step as is the case in the prior art but at the filter selection step. One advantage of this preferred embodiment of the invention is not processing a large number of pairs of adjacent blocks and therefore not insignificantly reducing the number of selection and then filtering operations to be performed.

According to the previous embodiment, said step of assessing the degradation of the digital image (Im) is characterized in that it is intended to provide a degradation measurement (DM) according to quantization step values of the current image (Im) and a previous image. The advantage of using at least two quantization steps is to be able to calculate a variation in the quantization step from one image to another and to be able to derive therefrom a degradation measurement (DM) which is more precise than the simple quantization step. Said measurement may possibly take account of the a priori knowledge data on the coding standard used.

Another object of the present invention is to provide a digital image processing device for implementing said method in an integrated circuit for example, using hardware or software means.

These aspects of the invention as well as other more detailed aspects will emerge more clearly from the following description of several embodiments of the invention, given by way of non-limiting examples and with regard to the accompanying drawings, in which.

The invention relates in particular to a method of post-processing a digital image encoded and decoded according to a block coding technique, for applications at a low bit rate and in real time. The coding technique implemented is in our example the MPEG-4 standard, but can also be the H.26L standard or any other equivalent standard. It should be noted that this method could also be applied to a fixed image, encoded for example by means of the JPEG standard.

Such a block coding technique decomposes a digital image into blocks. In the case of the MPEG-4 standard, said blocks are of constant size equal to 8 pixels×8 pixels. During encoding, said blocks are then subjected to a frequency transformation. In the case of MPEG-4 and the majority of standard techniques, it is a question of discrete cosine transformation DCT. During decoding, block effects may appear at the boundaries of blocks.

A block effect resembles an edge but has no real existence in the content of the image proper. The objective of the invention is in particular to eliminate false edges situated at the boundaries of blocks as effectively as but in a much less complex manner than conventional methods.

Figure 2:
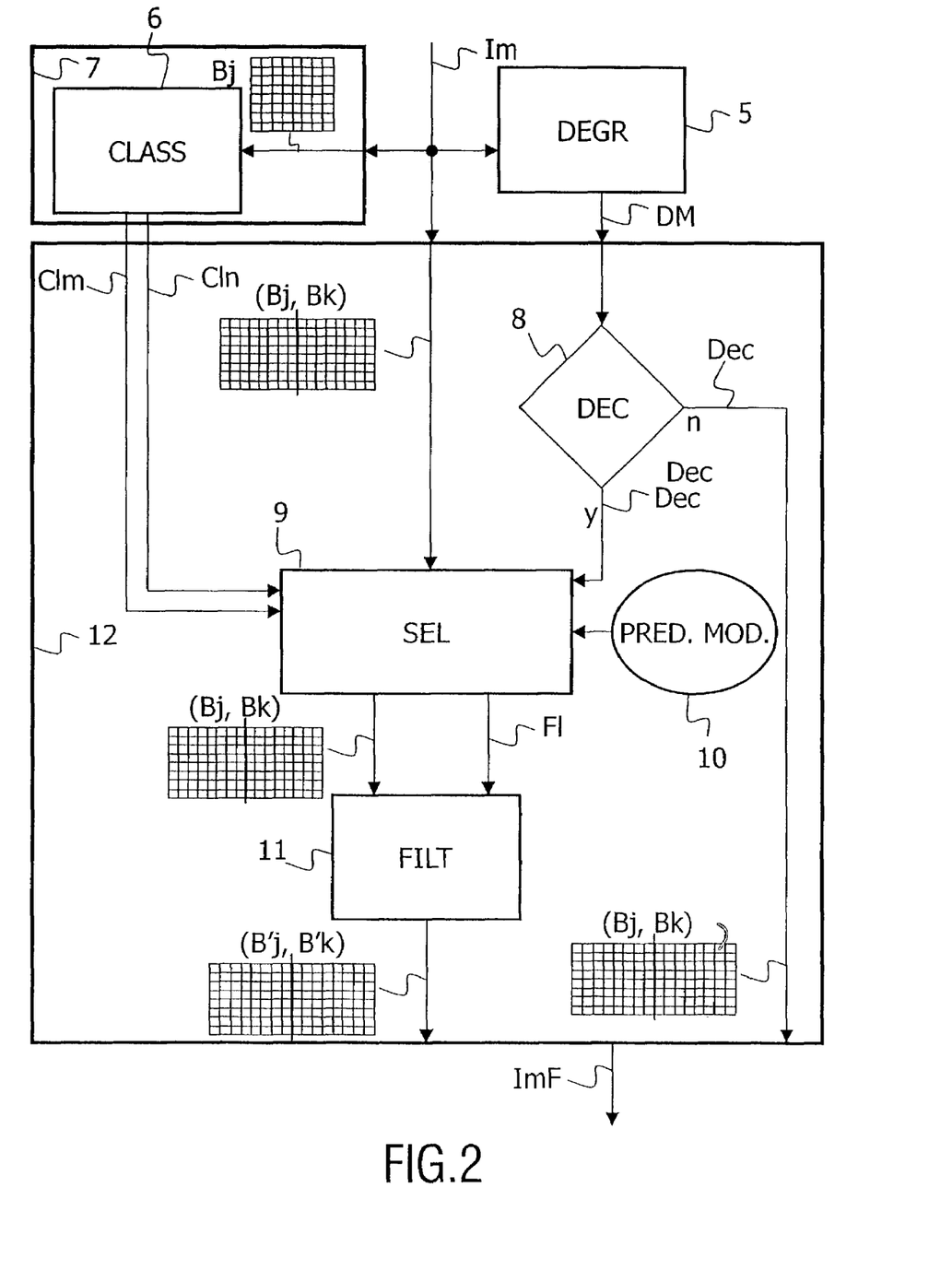
FIG. 2 is a block diagram of the digital image post-processing method according to the invention.

FIG. 2 depicts a block diagram summarizing the functioning of a digital image processing method according to the invention. A decoded digital image Im is first of all presented at the input of a degradation assessment step DEGR (5), which delivers a degradation measurement DM of the digital image Im.

A filtering decision step DEC (8) in accordance with said degradation measurement DM then follows. Said filtering decision step decides, for a pair of adjacent blocks ($B_j$, $B_k$) with $0 \leq j$, $k < nb_{max}$, $nb_{max}$ being the total number of blocks present in the image Im, $j \neq k$ and a degradation measurement DM, whether or not a filtering step is necessary. Said decision Dec is taken independently of the other steps of the method, which will be described below, and in this regard can therefore be applied to various stages of the method. This can, for example, be lastly, that is to say at said filtering step, as in the state of the art, but this is not limiting. As will be seen later, it is even more advantageous to apply this decision as far upstream as possible, so as to eliminate a maximum number of cases to be processed.

In parallel to the steps of degradation assessment DEGR (5) and filtering decision according to the degradation DEC (8) described above, said image Im is presented block by block at a classification step CLASS (6). Said classification step CLASS (6) associates, with a block $B_j$, $0 \leq j < nb_{max}$, a class $Cl_i$, $i \geq 0$, chosen from among a set of predefined classes. It should be noted that said classification step CLASS (6) is implemented within a loop (7) for scanning the blocks $B_j$, $0 \leq j < nb_{max}$, present in the digital input image Im.

As from this stage, it is no longer isolated blocks that are considered but pairs of blocks which are adjacent horizontally and vertically. A pair of adjacent blocks ($B_j$, $B_k$) with $0 \leq j$, $k < nb_{max}$ and $j \neq k$, associated with a pair of classes ($Cl_m$, $Cl_n$), with $m \geq 0$ and $n \geq 0$ and with a degradation measurement DM, is then processed by means of a filter selection step SEL (9). Said filter selection step SEL (9) delivers a filter $F_1$, $>0$, to be applied to said pair of adjacent blocks ($B_j$, $B_k$) with $0 \leq j$, $k < nb_{max}$ and $j \neq k$. The choice of the filter $F_1$, is made according to the pair of classes ($Cl_m$, $Cl_n$) associated with the pair of adjacent blocks ($B_j$, $B_k$) and according to the degradation measurement DM of the digital input image Im, from predefined models 10 associating pairs of classes with filters.

Said pair of adjacent blocks ($B_j$, $B_k$) with $0 \leq j$, $k < nb_{max}$ and $j \neq K$ and its associated filter F1 are then presented at the input of a filtering step FILT (11), which delivers a pair of filtered adjacent blocks ($B'_j$, $B'_k$) with $0 \leq j$, $k < nb_{max}$ and $j \neq K$.

The filter selection SEL (9) and filtering FILT (11) steps proper are preferably performed for all the pairs of horizontally and vertically adjacent blocks present in the digital input image Im. They are therefore implemented within a loop (12) for scanning the digital input image Im.

The method according to the invention delivers, for a decoded digital image Im, a filtered decoded digital image ImF.

The various steps of the method according to the invention will now be considered in more detail.

The degradation assessment step DEGR (5) receives as an input a digital image Im and delivers a degradation measurement of said digital image Im. This assessment of the degradation is based on the quantization step QP used during encoding.

In the preferred embodiment of the invention, the measurement does not directly correspond to the value of said quantization step QP but rather to a modified value of QP according to known characteristics of the video data compression technique used. For example, in the case of MPEG-4, it is known that the entire first image of the sequence (in other words the first Intra image, coded independently of the other images in the sequence) is always quantized in an excessively coarse fashion. It is therefore of relatively poor quality. Consequently a certain number of images which follow it and depend on it for their encoding (these are predicted images, referred to as images P) are of lesser quality than might be indicated by the quantization step associated with them.

In the method according to the invention, the degradation measurement DM(IM) is in some way a virtual quantization step. It is assessed according to the quantization step QP of the image Im, as follows:

if the quantization step $QP_{prec}$ of the preceding image is equal to the maximum value predicted by the standard (for MPEG-4 this is 31), then the degradation measurement DM is fixed at 30. This is because, if $QP_{prec}$=31, it is known that the current image is the first in the sequence. For the reasons mentioned above, a very high degradation measurement DM is automatically allocated to it.

if not, if the quantization step $QP_{prec}$ of the preceding image is less than the quantization step QP of the current image, then the degradation DM is fixed at the value of QP. If the quantization step is increased, this increase is therefore immediately passed on to the degradation measurement DM.

Otherwise the variation in the quantization step is assessed:

$variation_{Qp}=QP_{prec}-QP$ and the degradation measurement DM is calculated as follows: $DM=QP_{prec}-variation_{Qp}/4$. If the quantization step is decreased, the degradation measurement is made to follow the same trend, but more gently.

Figure 3:
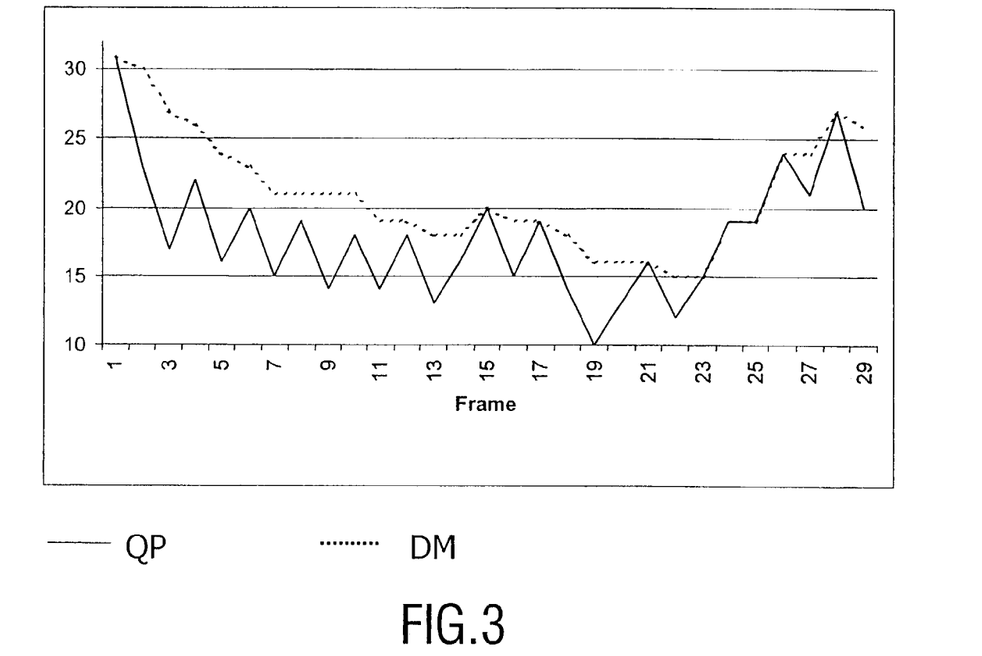
FIG. 3 presents curves for the change in the quantization step and the degradation measurement according to the invention throughout a sequence of digital images coded and decoded according to a block coding technique, FIG. 4 describes a sub-block considered within a block for choosing a class within the classification step.

An example of change in the degradation measurement DM over a sequence of images compared with the change in the quantization step QP is presented in FIG. 3.

The filtering decision step DEC (8) according to the degradation measurement DM calculated for the current image Im is preferably applied to all the pairs of possible adjacent blocks of the image Im. For a pair of adjacent blocks ($B_j$, $B_k$), any edge to be corrected is situated at the boundary between the blocks $B_j$ and $B_k$. The purpose of said filtering decision step DEC (8) is to consider that it is a true edge and in this first case to decide not to filter, or to consider that it is not a true edge and in this second case to decide to filter it in order to make it disappear. To do this, the maximum difference in intensity Diff which exists between the blocks $B_j$ and $B_k$ in the pair is considered, from maximum and minimum intensity values for the two blocks in question, and this is compared with the weighted degradation measurement DM.

More precisely, the decision to filter Dec is taken according to the following criterion:

if the maximum intensity difference Diff between the blocks $B_j$ and $B_k$ is less than 1.5 times the degradation measurement, then the filtering decision is positive. In this case, it is therefore considered that a true edge is not involved, otherwise it is negative. This time, the difference in intensity Diff is judged to be sufficiently great for it to be a case of a true edge.

As already mentioned, this decision Dec can be taken into account at different levels of the method according to the invention. On the other hand, the earlier the decision Dec is taken, the smaller the number of pairs of classes to be processed during the following steps. In a preferred embodiment of the invention, the filtering decision step DEC (8) for a pair of blocks inhibits or activates said filter selection step SEL (9) by pairs of adjacent blocks. In other words, the decision to filter or not a pair of adjacent blocks ($B_j$, $B_k$) according to the degradation measurement DM for the current image Im to which the pair ($B_j$, $B_k$) belongs, is carried out very early during the digital image post-processing method according to the invention. By eliminating the inputs from the step of selecting the pairs of adjacent blocks, which in any event will not be filtered, the number of cases to be processed and therefore the complexity of said method are reduced to the maximum extent.

If FIG. 2 is considered once again, two parallel branches for processing a given image Im can be seen:

the first branch has just been described and comprises the degradation evaluation assessment step DEGR (5) and the filtering decision step DEC (8) which follows it, the second branch comprises the classification step CLASS (6), the filter selection step SEL (9) and the filtering step proper FILT (11).

As already mentioned, the classification step CLASS (6) processes entire blocks rather than segments of pixels. It applies to all the blocks $B_j$ of size P pixels×Q pixels (in MPEG-4, the blocks considered are of size 8×8), with $0 \leq j < nb_{max}$, of a decoded digital image Im. Within said block $B_j$, all the pixels are considered except the pixels of the edge.

Figure 4:
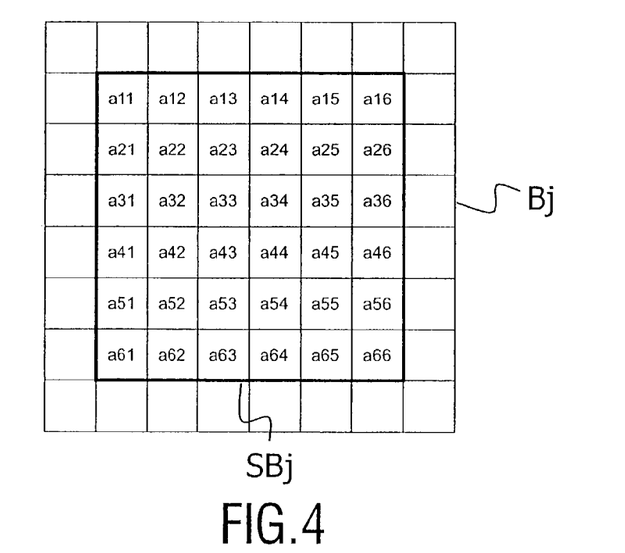

An example of an 8×8 block is given in FIG. 4. The sub-block $SB_j$ considered is therefore formed by a table of coefficients $\{a_{p,q}\}$, with p=1 ... P-2 and q=1 ... Q-2. Said classification step CLASS (6) consists of assessing certain types of discontinuities in intensity within this sub-block and comparing them with thresholds, the final object being to allocate a class $Cl_i$, $i \geq 0$ to each block $B_j$.

The choice is made from among at least two classes, namely, as in the prior art, a homogeneous class and a textured class. In a preferred embodiment of the invention, four classes are used, that is to say the homogeneous class $Cl_1$ and the textured class $Cl_4$ are supplemented by a class of rows $Cl_2$ and a class of columns $Cl_3$.

Consequently the classification step CLASS (6) assesses, for a sub-block $SB_j$ of a block $B_j$, the following discontinuities:

the block $B_j$ is said to be a member of the homogeneous class $Cl_1$ if it satisfies the following conditions:

$|m_1-m_2|<S$, with:

$m_1=\max\{a_{p,q}\}_{p=1...P-2,q=1...Q-2}$ and $m_2=\min\{a_{p,q}\}_{p=1...P-2,q=1...Q-2}$ m1 is the maximum of the coefficients $a_{p,q}$ of the sub-block $SB_j$, m2 is the minimum of the coefficients $a_{p,q}$ of the sub-block $SB_j$.

the block $B_j$ is said to be a member of the class of rows $Cl_2$ if, for any line p, p=1 ... P-2 of the sub-block $SB_j$:

$|m_1-m_2|<S$ with:

$m_1 = \max\{a_{p,q}\}_{q=1 \ldots Q-2}$ and $m_2 = \min\{a_{p,q}\}_{p=1 \ldots Q-2}$ m1 is the maximum of the coefficients $a_{p,q}$ of the row p sub-block $SB_j$, m2 is the minimum of the coefficients $a_{p,q}$ of the row p of the sub-block $SB_j$.

the block $B_j$ is said to be a member of the class of columns $Cl_3$ if, for any column q, q=1 ... Q-2 of the sub-block $SB_j$:

$|m_1-m_2|<S$, with:

$m_1 = \max\{a_{p,q}\}_{p=1 \ldots P-2}$ and $m_2 = \min\{a_{p,q}\}_{p=1 \ldots P-2}$ m1 is the maximum of the coefficients $a_{p,q}$ of the column q of the sub-block $SB_j$, m2 is the minimum of the coefficients $a_{p,q}$ of the column q of the sub-block $SB_j$.

if none of the above conditions is satisfied, the block $B_j$ is said to be a member of the textured class $Cl_4$.

Said threshold S is for example fixed at 3 units of intensity, according to considerations related to the human visual system for an 8×8 block.

The filter selection step SEL (9) by pair of adjacent blocks compares the classes of the blocks in said pair of adjacent blocks with predefined models associating pairs of classes and filters. A pair of adjacent blocks ($B_j$, $B_k$) and the pair of classes ($Cl_m$, $Cl_n$) associated with it by the previous classification step CLASS (6) are presented at the input of said filter selection step SEL (9), as well as the degradation measurement DM associated with the current image Im comprising the pair of blocks ($B_j$, $B_k$). Said predefined models were also constructed from considerations on the properties of the human visual system, well known to persons skilled in the art. The most important property in the present case is called texture masking and is represented by the fact that the eye is insensitive to faults in a very textured area of the image. In these areas it is therefore unnecessary to filter. There is in fact more a risk of damaging the true contours of any objects present than reducing the block effects, the latter being scarcely visible to the human eye. On the other hand, in the homogeneous areas, the human eye is very sensitive to edge effects and it is all the more easy to filter, the fewer true contours there are to be preserved in the area.

During this filter selection step SEL (9), the degradation measurement DM of the image Im makes it possible to refine the choice of the filter to be applied. This is because, if the degradation measurement is high, it will be possible to filter more strongly in order to compensate for the coarse quantization.

Consequently it can be seen that it is possible to a priori define models which associate an appropriate choice of filter with a pair of classes and a degradation measurement. For example, if the pair of adjacent blocks ($B_j$, $B_k$) is associated with the pair of homogeneous classes ($Cl_1$, $Cl_1$), the smoothing filter chosen is very strong and, the higher the degradation measurement, the stronger it is. For a pair of classes of rows ($Cl_2$, $Cl_2$), fairly strong horizontal smoothing is possible, since it takes place in the direction of the rows. Contrary to this, for a pair of classes of columns ($Cl_3$, $Cl_3$), the horizontal filter chosen is a null filter.

In conclusion, no calculation is made at this level. The filter selection step consists of consulting pre-established tables in order to select a filter therein.

The filtering step FILT (11) filters a pair of adjacent blocks ($B_j$, $B_k$) by means of the filter $F_1$ which was associated with it by means of the previous filter selection step SEL (9). The filters used are very simple. They are linear low-pass filters which are applied either in the vertical direction or in the horizontal direction. They are distinguished from each other by the number of pixels on which they act on each side of the boundary between the two blocks. For a pair of adjacent 8×8 blocks, the same linear filter $F_1$ is therefore applied for each row in the pair if it is a horizontal pair, or respectively for each column if it is a vertical pair, and therefore eight consecutive times. It should be noted that, in the case of an implementation of the method using hardware means, this repetition of identical actions allows very effective optimizations.

Figure 5:
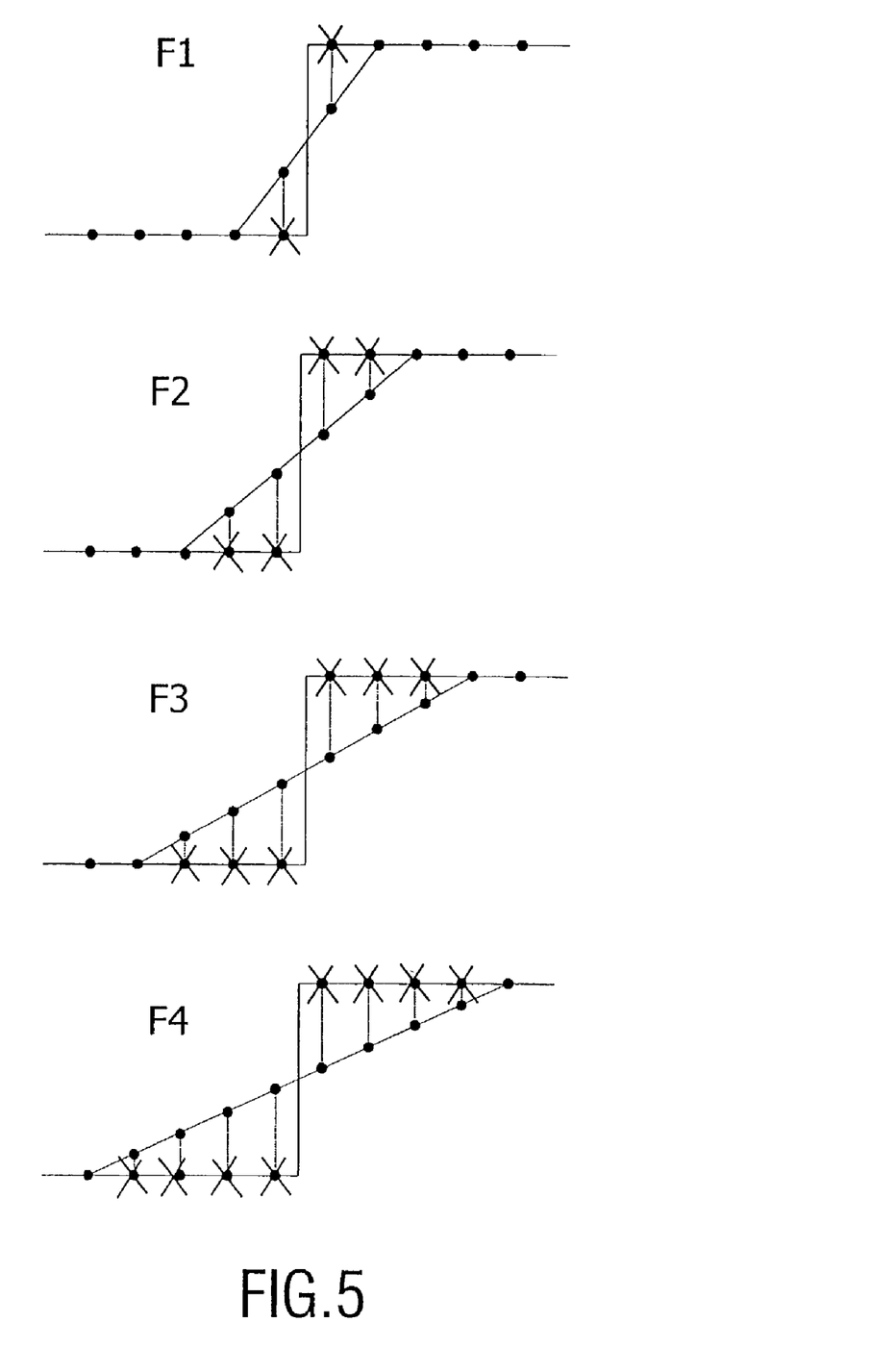
FIG. 5 presents four smoothing filters which can be used advantageously by the digital image post-processing method according to the invention.

In a preferred embodiment of the invention, four smoothing filters are used. Said filters are described in FIG. 5. They constitute a good compromise between simplicity and effectiveness, but use could also be made of more complex filters or even a larger number of filters.

Figure 6:
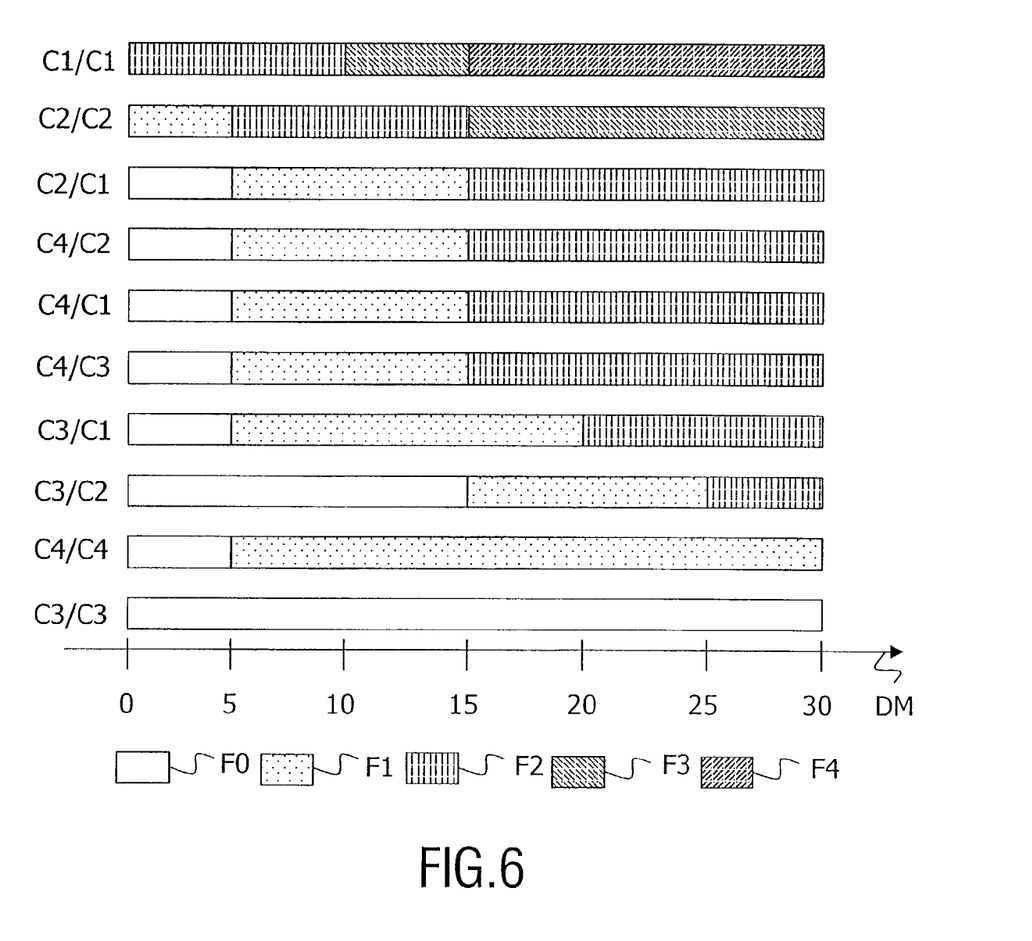
FIG. 6 presents associations of pairs of classes and of a filter according to a degradation measurement according to the invention.

In this same preferred embodiment of the invention, the predefined models used for the four smoothing filters presented above are described in FIG. 6.

It should be noted that said predefined models presented in FIG. 6 are only one example of possible associations.

It should be noted that not all the pairs of adjacent blocks are filtered. As seen previously, the decision to filter or not a pair of adjacent blocks ($B_j$, $B_k$) is conditional on the decision taken by the decision step according to the degradation measurement DM of the current image Im.

In the preferred embodiment of the invention, the classification step using four classes is more selective than the state of the art, which compensates for the fact that the filtering step is greatly simplified. It is found in fact that the patterns of rows and columns are fairly normally encountered in video data coded and decoded at a relatively low bit rate. Identifying them as from the classification step makes it possible to filter them in a more adapted fashion with simple filters.

The preferred embodiment of the invention results in a performance identical to that of the prior art in terms of visual quality, at the cost of a quarter of the complexity. Such a reduction in the complexity is mainly due to the fact that the classification and filtering are applied to whole blocks or pairs of blocks rather than to segments of blocks or pairs of blocks and the fact that the filters used are very simple and non-adaptive.

The present invention can be implemented in the form of software loaded in one or more circuits implementing the method for the processing of digital images described above, or in the form of integrated circuits. The device for the post-processing of digital images coded and decoded according to a block compression technique corresponding to said method repeats here the functional blocks of FIG. 2. It comprises:

classification means intended to allocate a class ($Cl_i$) to a block ($B_j$) of pixels of said digital image Im, filter selection means (SEL) intended to associate a filter ($F_1$) with a pair of adjacent blocks ($B_j$, $B_k$) according to those respective classes ($Cl_m$, $Cl_n$) and the degradation measurement (DM) of said digital image (Im), filtering decision means intended to deliver a filtering decision per pair of adjacent blocks, filtering decision means (DEC) intended to deliver a filtering decision (Dec) for a pair of adjacent blocks ($B_j$, $B_k$) according to the degradation measurement (DM), filtering means (FILT) intended to filter a pair of adjacent blocks ($B_j$, $B_k$) by means of its associated filter ($F_1$).

Figure 7:
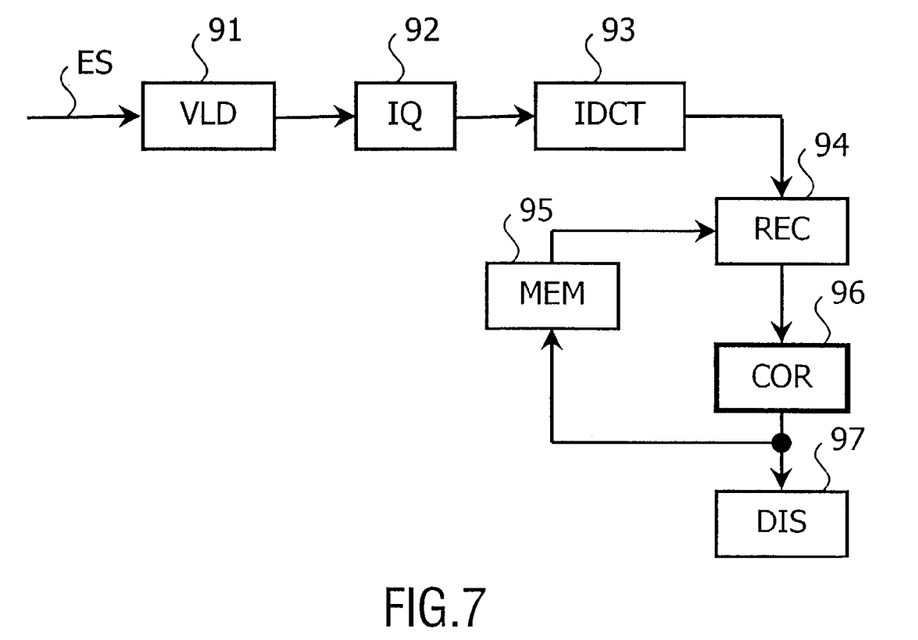
FIG. 7 is a block diagram of the decoding process including the digital image processing method according to the invention, and, FIG. 8 is a block diagram of the coding process including the digital image processing method according to the invention.

FIG. 7 illustrates the functioning of a video decoder suitable for producing decoded digital images and comprising a processing device implementing a processing method according to the invention.

Said video decoder comprises:

variable length decoding means VLD (91) of encoded digital data ES, suitable for producing quantized data, inverse quantization means IQ (92) of the quantized data, suitable for producing transformed data, an inverse frequency transformation device, in our example an inverse discrete cosine transform IDCT (93) of transformed data into inversely transformed data as described earlier.

The decompression device further includes a reconstruction step REC (94) of the image data-block-by-data-block thanks to an image memory MEM (95). With the processing device COR (96) implementing the processing method according to the invention, said device is suitable for processing the blocks of the reconstructed digital images so as to produce digital images processed for being displayed on a screen DIS (97).

Figure 8:
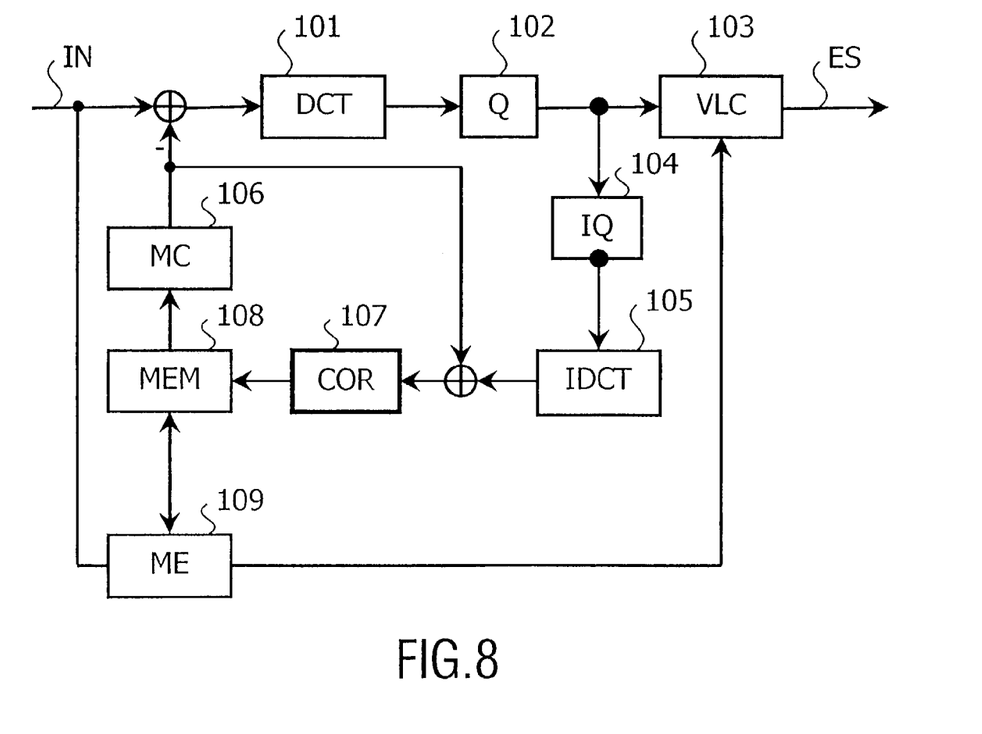

FIG. 8 illustrates the functioning of a video coder suitable for receiving digital images IN in the form of data blocks and comprising in the coding loop inverse frequency transformation means followed by a processing device, which utilizes the processing method according to the invention.

The video coder (100) comprises:

a direct frequency transformation device, here a direct discrete cosine transformation DCT (101) of digital video data and transformed data as described earlier, quantization means Q (102) for quantizing transformed data, suitable for producing quantized data, and variable length coding means VLC (103) for coding quantized data, suitable for producing coded data ES.

It also comprises a prediction unit including a series combination:

inverse quantizing means IQ (104) for inversely quantizing the quantized data, suitable for producing transformed data, an inverse discrete cosine transforming device IDCT (105) for transforming transformed data into inversely transformed data as described earlier, an adder of data coming from the transformation device IDCT and from a motion compensation device MC (106), the processing device COR (107) implementing the processing method according to the invention and suitable for processing blocks of decoded data coming from the output of the adder so as to supply processed data blocks to an image memory MEM (108), the image memory MEM (108) suitable for storing the images used by the motion compensation device MC (106), and the motion vectors coming from a motion estimation device ME (109), and a subtracter suitable for subtracting the data coming from the motion compensation device from the digital video data of the input IN, the result of this subtracter being delivered to the transformation device DCT.

It is also possible to insert the processing device COR (107) between the inverse cosine transforming device IDCT (105) and the adder, the processing being effected on a differential signal and not on a reconstructed signal.

The processing device which implements the processing method according to the invention may also improve the performance of a video coder, notably in terms of coding quality, but also in terms of output bit rate. Furthermore, when the video coder of FIG. 8 and the video decoder of FIG. 7 are connected in cascade, this permits to obtain an excellent image quality much better than that obtained with a standard video coder in a cascade arrangement with the video decoder of FIG. 7 or with that of the video coder of FIG. 8 in a cascade arrangement with a standard video decoder.

There are many ways of implementing the functions mentioned above by means of software. In this regard, FIG. 2 is highly schematic. Therefore, although it shows several functions in the form of separate blocks, this does not exclude a single item of software performing several functions. Nor does this exclude a single function being able to be performed by a set of software. It is possible to implement these functions by means of a video decoder circuit, a digital television receiver-decoder circuit ("set-top box"), or a television receiver circuit, said circuit being suitably programmed. A set of instructions contained in a programming memory can cause the circuit to perform the various operations described above with reference to FIG. 2. The set of instructions can also be loaded into the programming memory by reading a data medium, such as for example a disk which contains the set of instructions. The reading can also be performed by means of a communication network, such as for example the Internet. In this case, a service provider will make the set of instructions available to interested parties.

No reference sign between parentheses in the present text should be taken limitingly. The verb "comprise" and its conjugations does not exclude the presence of elements or steps other than those listed in a sentence. The word "a" or "one" preceding an element does not exclude the presence of a plurality of these elements or steps.

The invention claimed is:

1. A method for the post-processing of a digital image (Im) comprising pixels, said digital image being encoded and decoded according to a pixel-block coding technique, said method comprising a classification step (6) delivering classes ($Cl_i$), a step of evaluating the degradation (5) of said digital image delivering a degradation measurement (DM) of said digital image and a filtering step (11) delivering a filtered digital image (ImF), wherein:

said classification step (6) intended to allocate a class to a block ($B_j$) of pixels of said digital image (Im), a filter selection step (9) intended to associate a filter ($F_1$) with a pair of adjacent blocks ($B_j$, $B_k$) according to their respective classes ($Cl_m$, $Cl_n$) and the degradation measurement (DM) of said digital image (Im), a filtering decision step (8) intended to deliver a filtering decision (Dec) for a pair of adjacent blocks ($B_j$, $B_k$) according to the degradation measurement (DM), said filtering step (11) intended to filter a pair of adjacent blocks ($B_j$, $B_k$) by means of its associated filter ($F_1$).

2. A post-processing method as claimed in claim 1, wherein said classification step (6) is able to distinguish at least four distinct classes ($Cl_i$), that is to say a homogeneous class, a class of rows, a class of columns and a textured class.

3. A post-processing method as claimed in claim 2, wherein said method uses at least four different filters ($F_1$).

4. A post-processing method as claimed in claim 1, wherein:

said filtering decision step (8) for a pair of adjacent blocks ($B_j$, $B_k$) according to the degradation measurement (DM) is intended to inhibit or activate said filter selection step (9) per pair of adjacent blocks.

5. A post-processing method as claimed in claim 1, wherein the degradation assessment step (5) is intended to provide a degradation measurement (DM) according to quantization step values of the current image (Im) and a preceding image.

6. A device for the post-processing of a digital image (Im) comprising pixels, said digital image being encoded and decoded according to a technique of coding by blocks of pixels, said device comprising classification means (6) delivering classes ($Cl_i$), means of assessing the degradation (5) of said digital image (Im) delivering a degradation measurement (DM) of said digital image and filtering means (11) delivering a filtered digital image (ImF), wherein:
  said classification means (6) intended to allocate a class ($Cl_i$) to a block ($B_j$) of pixels of said digital image (Im),
  filter selection means (9) intended to associate a filter ($F_l$) with a pair of adjacent blocks ($B_j$, $B_k$) according to their respective classes ($Cl_m$, $Cl_n$) and the degradation measurement (DM) of said digital image (Im),
  filtering decision means (8) intended to deliver a filtering decision (Dec) for a pair of adjacent blocks ($B_j$, $B_k$) according to the degradation measurement (DM),
  said filtering means (11) intended to filter a pair of adjacent blocks ($B_j$, $B_k$) by means of its associated filter ($F_l$).

7. A processing device as claimed in claim 6, wherein said classification means (6) comprise at least four classes ($Cl_i$), that is to say a homogeneous class, a class of rows, a class of columns and a textured class.

8. A decoder for decoding a digital image encoded according to a block coding technique, comprising a digital image processing device as claimed in the claim 6 suitable to process the decoded digital image (Im).

9. A coder suitable for receiving digital images in the form of pixel blocks and comprising inverse frequency transformation means followed by a processing device which implements the processing method as claimed in claim 1, suitable for processing decoded pixel blocks coming from said inverse frequency transformation means so as to produce processed pixel blocks.

10. A portable device comprising a decoder as claimed in claim 8, for displaying the processed digital images on the screen of said device.

11. A computer readable storage medium having code for post-processing a digital image encoded and decoded according to a block coding technique, said computer readable storage medium comprising:
  code for a classification step delivering classes, a step of evaluating the degradation of said digital image delivering a degradation measurement of said digital image and a filtering step delivering a filtered digital image, said classification step intended to allocate a class to a block of pixels of said digital image,
  code for a filter selection step intended to associate a filter with a pair of adjacent blocks according to their respective classes and the degradation measurement of said digital image,
  code for a filtering decision step intended to deliver a filtering decision for a pair of adjacent blocks according to the degradation measurement, said filtering step intended to filter a pair of adjacent blocks by means of its associated filter.

* * * * *